United States Patent
Kellogg, Jr. et al.

(10) Patent No.: US 7,318,675 B2
(45) Date of Patent: Jan. 15, 2008

(54) DEVICE FOR TEMPORARY REPAIR OF AUGER CARRIER BEARINGS

(76) Inventors: Bill Kellogg, Jr., 531 S. 179 Hwy., Athony, KS (US) 67003; Donald Clark, 3131 SW. 89th St., Apt. 16107, Oklahoma City, OK (US) 73159

(*) Notice: Subject to any disclaimer, the term of this patent is extended or adjusted under 35 U.S.C. 154(b) by 712 days.

(21) Appl. No.: 10/820,069

(22) Filed: Apr. 8, 2004

(65) Prior Publication Data

US 2005/0226544 A1    Oct. 13, 2005

(51) Int. Cl.
B65G 33/32    (2006.01)
(52) U.S. Cl. .................. 384/443; 384/428; 198/672
(58) Field of Classification Search ........... 384/428, 384/434, 437, 442, 443; 198/662, 672; 403/26
See application file for complete search history.

(56) References Cited

U.S. PATENT DOCUMENTS

| | | | |
|---|---|---|---|
| 1,875,969 A * | 9/1932 | Weiss .................... | 280/506 |
| 1,900,938 A | 3/1933 | Kerruish | |
| 1,999,230 A * | 4/1935 | Bilderback et al. ........ | 384/266 |
| 2,021,363 A * | 11/1935 | Hutchinson ............. | 198/672 |
| 2,279,201 A * | 4/1942 | Kozak et al. ............ | 198/666 |
| 2,630,341 A * | 3/1953 | Downey ................ | 403/26 |
| 2,710,235 A * | 6/1955 | Olsen .................. | 384/263 |
| 3,112,963 A * | 12/1963 | Cardwell ............... | 384/397 |
| 3,428,372 A * | 2/1969 | Keller et al. ............ | 384/536 |
| 3,464,882 A | 9/1969 | Morton | |
| 3,730,332 A * | 5/1973 | Benzon et al. .......... | 198/666 |
| 3,786,689 A | 1/1974 | Houk | |
| 4,358,168 A | 11/1982 | Kallin | |
| 4,567,820 A | 2/1986 | Munsell | |
| 4,880,318 A | 11/1989 | Shibahara et al. | |
| 5,118,070 A | 6/1992 | Reid | |
| 5,971,654 A | 10/1999 | Sweeney, Jr. | |
| 6,085,419 A | 7/2000 | Poitras | |
| 6,347,903 B1 | 2/2002 | Knighton | |

FOREIGN PATENT DOCUMENTS

| | | |
|---|---|---|
| EP | 0 341 814 A1 | 11/1989 |
| JP | 57090434 | 6/1982 |
| JP | 9296881 | 11/1997 |
| JP | 10030592 | 2/1998 |

* cited by examiner

*Primary Examiner*—William C. Joyce
(74) *Attorney, Agent, or Firm*—Richard C. Litman

(57) ABSTRACT

The device for temporary repair of auger carrier bearings is an assembly used to serve as a temporary to semi-permanent replacement for the carrier bearings of auger rotary shafts. The assembly comprises a U-bolt having threaded legs and a flat strap having two openings that are aligned with the threaded legs of the U-bolt. The points of contact between the auger rotary shaft and the assembly are the middle of the strap and the arch of the U-bolt. To these points are attached pads of self-lubricating plastic to provide a low friction interface between the assembly and the auger rotary shaft. The device for temporary repair of auger carrier bearings hangs from a plate that spans the tray of the auger and has two openings that correspond to the legs of the U-bolt.

7 Claims, 3 Drawing Sheets

DEVICE FOR TEMPORARY REPAIR OF AUGER CARRIER BEARINGS

BACKGROUND OF THE INVENTION

1. Field of the Invention

The present invention relates to bearing systems, and particularly to a device for the temporary repair of auger carrier bearings in order to avoid costly down time in repairing or replacing an auger carrier bearing.

2. Description of the Related Art

Farmers, ginners and other agricultural personnel that use augers to move bulk or aggregate material often experience the problem that the auger carrier bearing fails, thereby requiring that the auger be shut down and the auger carrier bearing replaced, which is a costly and time-consuming procedure. Various improvements for bearings have been suggested, but none has adequately presented a quick, efficient product that can bring an auger with a failed auger carrier bearing back in to service without having to disassemble the auger.

U.S. Pat. No. 1,900,938, issued Mar. 14, 1933 to E. P. Kerruish, shows a method of making a lined bearing. U.S. Pat. No. 3,464,882, issued Sep. 2, 1969 to H. C. Morton, teaches an antifriction bearing element that is formed by impregnating fibers with a thermosetting resin. U.S. Pat. No. 3,786,689, issued Jan. 22, 1974 to R. D. Houk, describes a single lever joystick apparatus that features a bearing coated with self-lubricating plastic. U.S. Pat. No. 4,358,168, issued Nov. 9, 1982 to I. N. Kallin, discloses a thrust bearing that uses a U-bolt to secure an auger tube.

U.S. Pat. No. 4,567,820, issued Feb. 4, 1986 to F. E. Munsell, shows a silo bag packing machine having an auger supported by bearings encased in the housing of the silo bag packing machine. U.S. Pat. No. 4,880,318, issued Nov. 14, 1989 to Akihiro Shibahara et al., teaches a slidable, vibration-isolating rubber member that is self-lubricating. U.S. Pat. No. 5,118,070, issued on Jun. 2, 1992 to G. J. Reid, describes a stabilizer bar mount featuring a rubber support contained by a U-shaped bracket. U.S. Pat. No. 5,971,654, issued Oct. 26, 1999 to T. J. Sweeney, Jr., discloses full floating axle rotating caps that have U-bolts lined to prevent wear.

U.S. Pat. No. 6,085,419, issued Jul. 11, 2000 to Leo Poitras, shows a parts carrier bearing assembly repair method. U.S. Pat. No. 6,347,903, issued Feb. 19, 2002 to G. S. Knighton teaches a fly clamp for reinforcing bars in concrete construction.

Japanese Patent No. 57-90,434, published Jun. 5, 1982, shows a reinforced leaf spring for a vehicle. European Patent No. 341,814, published on Nov. 15, 1989, teaches a clamp for resilient mounting of metal bars, especially sway bars. Japanese Patent No. 9-296,881, published Nov. 18, 1997, describes an electric insulating U-bolt and electric insulating pipe covering method therefore. Japanese Patent No. 10-30,592, published Feb. 3, 1998, discloses a method for attaching a blower blade to a hub plate.

None of the above inventions and patents, taken either singly or in combination, is seen to describe the instant invention as claimed. Thus a device for temporary repair of auger carrier bearings solving the aforementioned problems is desired.

SUMMARY OF THE INVENTION

The device for temporary repair of auger carrier bearings is an assembly used to serve as a temporary to semi-permanent replacement for the carrier bearings of auger rotary shafts. The assembly comprises a U-bolt having threaded legs and a flat strap having two openings that are aligned with the threaded legs of the U-bolt. The U-bolt is placed on one side of the auger rotary shaft such that the arch of the U-bolt contacts the shaft and the legs of the bolt straddle the auger rotary shaft. The strap is fastened to the U-bolt legs on the opposite side of the shaft from the arch of the U-bolt. The strap is held in place by four threaded nuts, one on each side of the strap on both legs of the U-bolt.

The points of contact between the auger rotary shaft and the assembly are the middle of the strap and the arch of the U-bolt. Pads of self-lubricating plastic are attached to these points to provide a low friction interface between the assembly and the auger rotary shaft.

The device for temporary repair of auger carrier bearings hangs from a plate that spans the tray of the auger and has two openings that correspond to the legs of the U-bolt. The legs of the U-bolt go through the openings in the plate and are held in a fixed position by two threaded nuts, one nut being threaded on to each leg.

Accordingly, it is a principal object of the invention to provide temporary to semi-permanent repair to an auger system in the event of an auger rotary shaft carrier bearing failure.

It is another object of the invention to provide a worker with a fast method of repairing an auger carrier bearing so that an auger may be returned to service without costly and time-consuming downtime of the auger.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
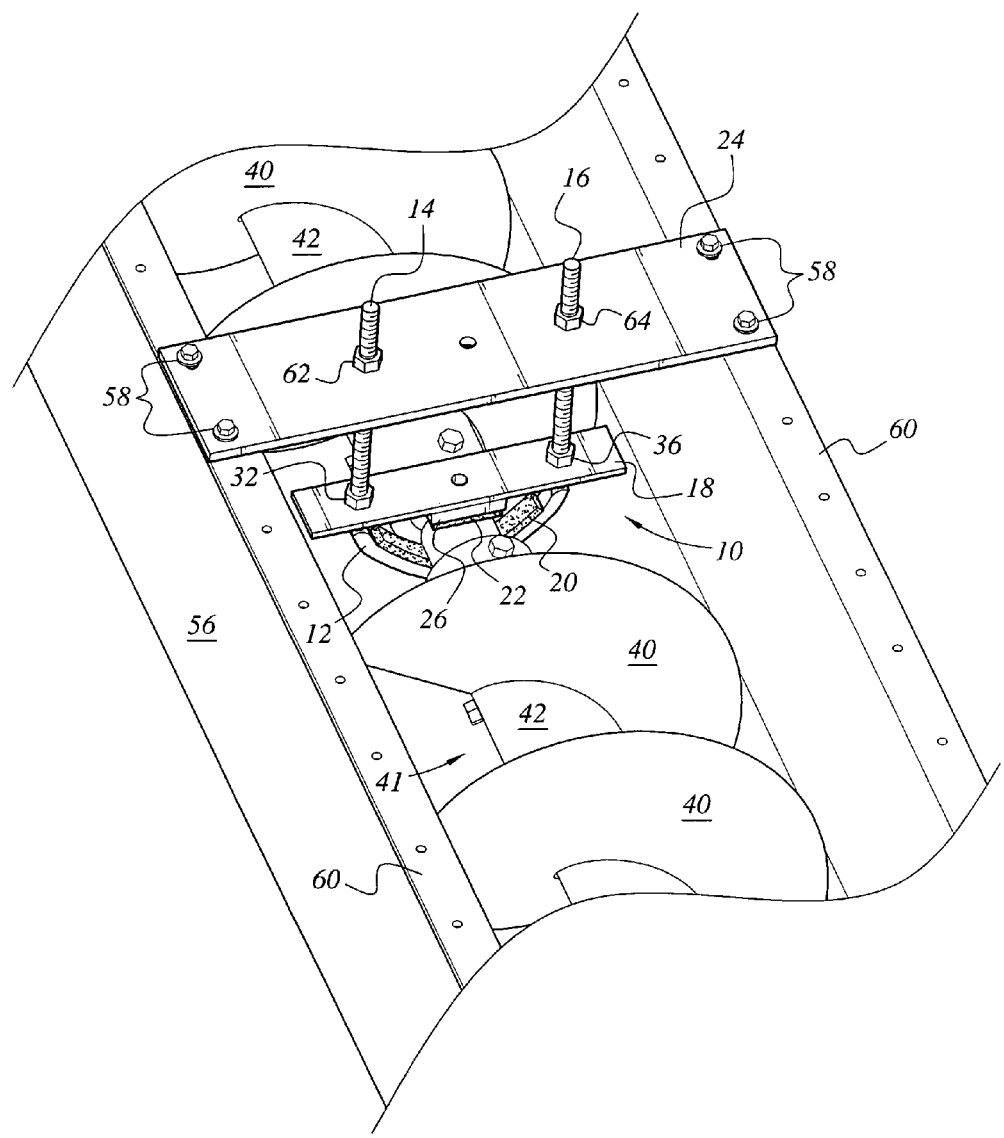
FIG. 1 is an environmental, perspective view of a device for temporary repair of auger carrier bearings according to the present invention.
Figure 2:
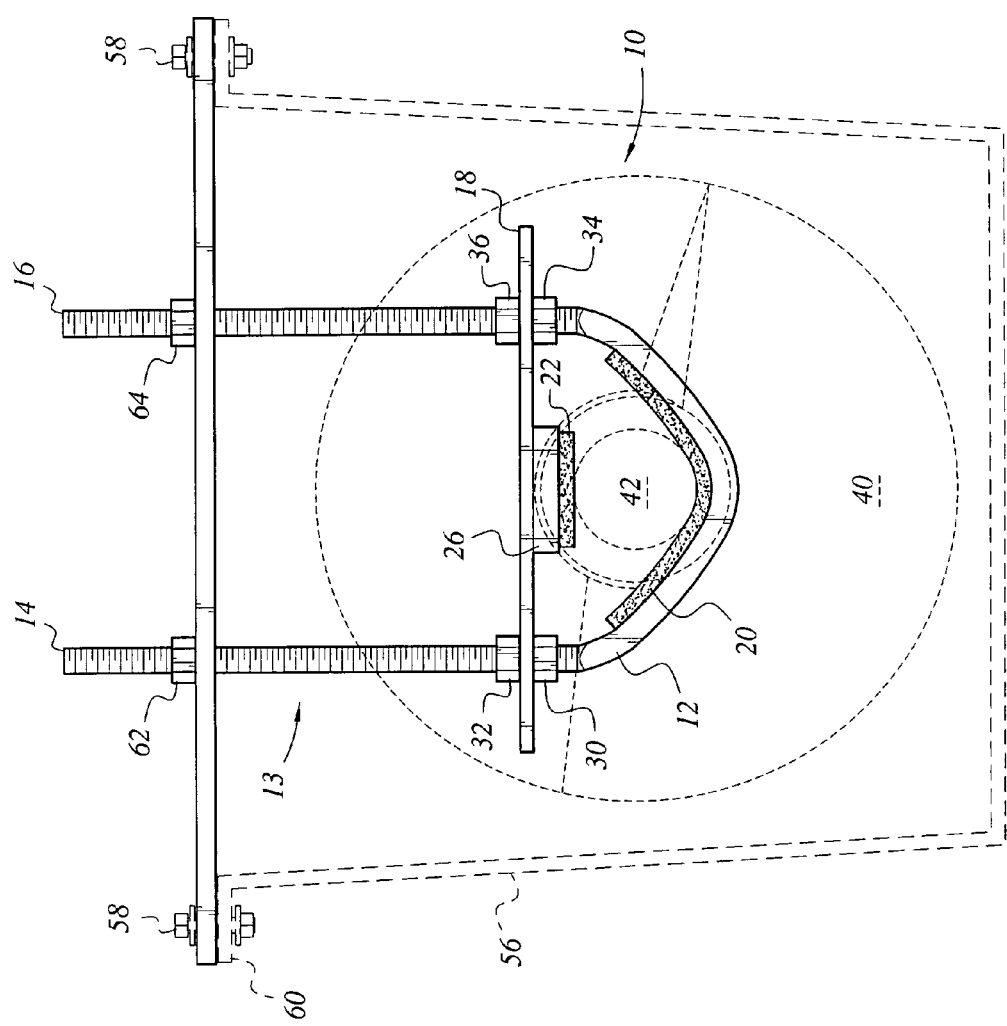
FIG. 2 is a front view of the device of the present invention in use on an auger system.
Figure 3:
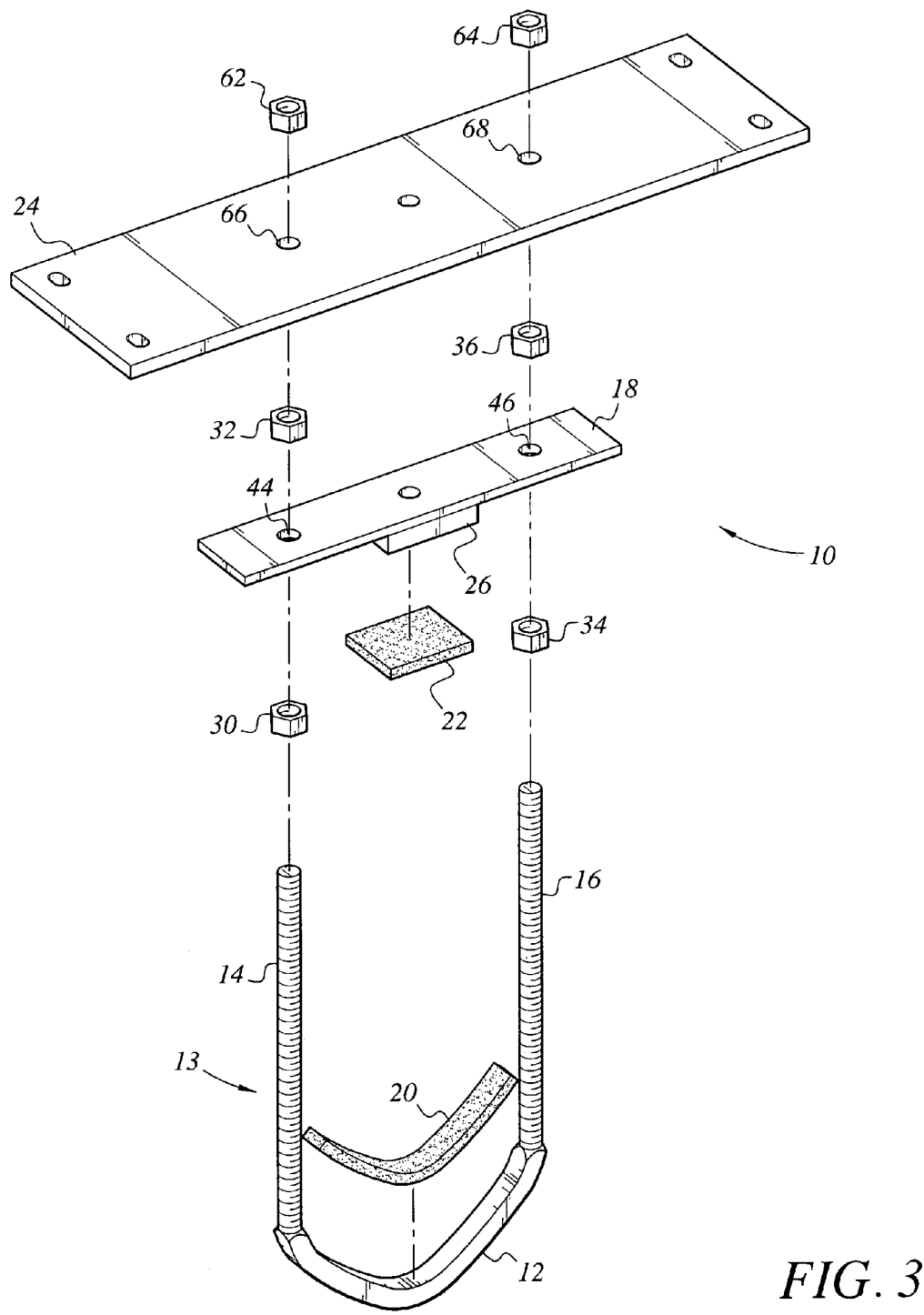
FIG. 3 is an exploded, perspective view of the device of the present invention, together with a bearing mounting plate.

The present invention is a device for the temporary replacement of auger carrier bearings, designated generally as 10 in the drawings. The device 10 is shown in FIGS. 1 and 2 in use on an auger system. Referring to FIG. 3, the device 10 comprises a U-bolt 13 with an arch 12, two threaded legs 14 and 16, a strap 18, a lubricating strip 20, a lubricating pad 22, a spacer 26, and a plurality of threaded nuts.

As shown in FIGS. 1 and 2, in a conveyor system for aggregate or bulk materials, an auger 41 disposed in an elongate tray 56 can be used. The tray 56 is generally U-shaped, having a bottom wall and opposing sidewalls defining a trough or channel. The sidewalls may have flanges 60 extending outwardly. A plurality of spaced apart bearing mounting plates 24 are attached to the flanges 60 and extend across the trough. Bearings (not shown) encircle the shaft 42 of the auger 41 and support the auger 41 above the bottom wall of the tray 56. Aggregate material is introduced into the trough at one end of the tray 56 and is conveyed to the opposite end by rotation of the auger 41.

From time to time a bearing may become worn, cracked, or otherwise require repair or replacement. Permanent replacement of the bearing generally requires considerable downtime, with consequent loss of conveyor productivity. The device 10 of the present invention provides a temporary replacement for the bearing, so that permanent replacement can be deferred to a normal maintenance interval, or other convenient time. The damaged bearing may be removed and temporarily replaced with device 10, or the damaged bearing may be left in place and the device 10 can be mounted on either side of the damaged bearing by installing a bearing mounting plate 24 to the flanges 60 in the desired location.

Referring back to FIG. 1, in the event of a carrier bearing failure on an auger system, the device 10 can be positioned between the blades 40 of the auger 41. This is accomplished by placing the U-bolt 13 between adjacent blades 40, supporting the shaft 42 of the auger 41 on the arch 12. The strap 18 is provided with openings 44 and 46 that align with the threaded legs 14 and 16. Strap 18 is positioned over the threaded legs 14 and 16 of the U-bolt 13 so that the strap 18 comes into contact with the rotary shaft 42 on the opposite side of the rotary shaft 42 from the arch 12 of the U-bolt 13.

The U-bolt 13 is equipped with a lubricating strip 20 positioned along the arch 12 to allow for free rotation of the rotary shaft 42. In the preferred embodiment the lower surface of the strap 18 has an attached spacer 26 to which lubricating pad 22 is attached, and the arch 12 has a rectangular cross-section. The lubricating strip 20 and the lubricating pad 22 are made of self-lubricating plastic to allow for free rotation of the rotary shaft 42. The lubricating strip 20 and lubricating pad 22 are permanently attached to the U-bolt 13 and spacer 26, respectively, by sunken or recessed rivets (not shown) or other attachment means so that the heads of the rivets or other fasteners do not scrape against the shaft 42 of the auger 41.

As shown in FIG. 3, the strap 18 is held in place on the threaded legs 14 and 16 by threaded nuts 30, 32, 34, and 36. Threaded nuts 30 and 34 prevent downward motion of the strap 18. Threaded nuts 32 and 36 prevent upward motion of the strap 18. The rotary shaft 42 has lateral movement restricted by attaching the U-bolt 13 to the bearing mounting plate 24.

Auger 41 is disposed in auger tray 56. Auger 41 is suspended in tray 56 and normally supported by bearings attached to bearing mounting plates 24, which extend across the trough defined by tray 56. When it is necessary to replace a broken or worn bearing with the device 10 of the present invention, the device 10 is held in a fixed position relative to the auger tray 56 by plate 24. Plate 24 sits on top of the auger tray 56 and is attached by bolts 58 to the flanges 60 of the auger tray 56, or alternatively, by tack welding or other attaching means. Threaded legs 14 and 16 are inserted through openings 66 and 68 in the plate 24 that align with the threaded legs 14 and 16. Threaded nuts 62 and 64 are screwed on to the threaded legs 14 and 16 thereby securing the device 10 in a fixed position.

The strap 18 is adjustable on the legs 14 and 16 of the U-bolt 13 in order to support an auger shaft 42 having a diameter between one and three inches.

It is to be understood that the present invention is not limited to the embodiment described above, but encompasses any and all embodiments within the scope of the following claims.

We claim:

1. A device for temporary replacement of an auger carrier bearing on an auger conveyor system, the conveyor system having a flanged auger tray defining a trough and an auger having a shaft supported in the trough by a plurality of bearings, the device comprising:
   a U-bolt having an arch and two threaded legs extending from opposite ends of the arch;
   a bearing mounting plate adapted for attachment to the auger tray across the trough; the mounting plate having a pair of openings defined therein aligned with the threaded legs of the U-bolt, and being removably disposed on the threaded legs;
   a substantially planar strap having an upper surface and a lower surface, and having a pair of openings defined therein aligned with the threaded legs of the U-bolt, the strap being removably disposed on the threaded legs substantially parallel to the mounting plate;
   a lubrication pad attached to the lower surface of the strap; and
   a lubrication strip attached to the arch of the U-bolt;
   whereby the auger shaft is supported by the U-bolt with the lubrication strip and the lubrication pad bearing on diametrically opposite sides of the auger shaft in order to support the auger in the trough.

2. The device for temporary repair of auger carrier bearings according to claim 1, further comprising a pair of nuts disposed on the threaded legs below said strap and a pair of nuts disposed on the legs above said strap in order to snugly secure the strap against the shaft of the auger.

3. The device for temporary repair of auger carrier bearings according to claim 1, wherein the arch of the U-bolt has a rectangular cross section.

4. The device for temporary repair of auger carrier bearings according to claim 1, wherein the lubrication pad is made of self-lubricating plastic.

5. The device for temporary repair of auger carrier bearings according to claim 1, wherein the lubrication strip is made of self-lubricating plastic.

6. The device for temporary repair of auger carrier bearings according to claim 1, further comprising a spacer disposed between the lubrication pad and the lower surface of the strap.

7. A method of temporarily replacing an auger carrier bearing comprising the step of placing the device for the temporary replacement of auger carrier bearings according to claim 1 on either side of a failed auger carrier bearing such that the auger shaft is supported by the U-bolt with the lubrication strip and pad bearing on opposite sides of the auger shaft.

* * * * *